United States Patent [19]
Stage

[11] 3,951,465
[45] Apr. 20, 1976

[54] ANTI-SKID DEVICE INCLUDING A GEAR-DRIVEN CAM PUMPING UNIT WITH FAIL-SAFE FEATURES

[76] Inventor: Jack W. Stage, 100 Mount Lyell Drive, San Rafael, Calif. 94903

[22] Filed: June 8, 1973

[21] Appl. No.: 368,429

[52] U.S. Cl. ................. 303/21 F; 74/13; 188/181 A; 303/10; 303/21 AF; 303/61
[51] Int. Cl.² .................. B60T 8/087; B60T 13/16
[58] Field of Search .......... 303/21 F, 21 AF, 21 A, 303/24 R, 61–63, 68–69, 49, 10; 188/181; 73/512, 514; 137/48; 74/13–15

[56] References Cited
UNITED STATES PATENTS

| | | | |
|---|---|---|---|
| 2,483,205 | 9/1949 | Jones | 303/61 |
| 3,046,060 | 7/1962 | Stager et al. | 73/514 |
| 3,276,822 | 10/1966 | Lister et al. | 303/61 UX |
| 3,325,226 | 6/1967 | Perrino | 303/49 |
| 3,466,098 | 9/1969 | Pieren et al. | 303/61 |
| 3,503,653 | 3/1970 | Davis et al. | 188/181 A |
| 3,524,684 | 8/1970 | Skoyles | 303/21 F |
| 3,574,416 | 4/1971 | Skoyles | 188/181 A |
| 3,829,166 | 8/1974 | Menar et al. | 303/10 |

Primary Examiner—Duane A. Reger
Assistant Examiner—Douglas C. Butler
Attorney, Agent, or Firm—Edward E. Dyson; John J. Byrne

[57] ABSTRACT

A motor vehicle wheel engages a gear which drives a multistage cam which actuates a system of hydraulic valves and pistons. A pressure-sensitive spool valve detects when the hydraulic pressure in the brake system exceeds the value which causes the wheel to enter the skid mode. The hydraulic pressure from the brake system passes through the pressure-sensitive valve to the system of hydraulic valves and pistons operated by the cam. The outlet of the hydraulic valve and piston system goes to the brake cylinder in the wheel. During the skid mode, a valve in the hydraulic valve and piston system closes and a cam action on one of the pistons in the system causes a pumping pressure to be applied to the brake cylinder. This anti-skid device further includes two fail-safe features to protect against system failure.

8 Claims, 8 Drawing Figures

ANTI-SKID DEVICE INCLUDING A GEAR-DRIVEN CAM PUMPING UNIT WITH FAIL-SAFE FEATURES

BACKGROUND OF THE INVENTION

1. Field of the Invention

This invention relates to the field of anti-skid devices for motorized vehicles. Cam action on a piston in the hydraulic system causes the pressure in that system to alternately increase and decrease thereby exerting a pumping action on the brake cylinder.

2. Description of the Prior Art

The problem of skidding in motor vehicles is not new and systems to cope with this problem are known in the prior art. Typically, the prior art systems include either a wheel-driven pump or a flyball approach. For instance, the Roberts U.S. Pat. No. 2,919,162 illustrates a prior art system in which a wheel-driven pump is employed. Perrino U.S. Pat. No. 3,325,226 and Stager et al. U.S. Pat. No. 3,046,060 are typical of prior art systems employing flyball lag. Skoyles U.S. Pats. No. 3,524,684 and 3,574,416 show anti-lock brake systems using a cam and piston technique. These latter systems do not produce any pumping action and they further depend on a pump operating independently of the wheels.

There are several drawbacks to the typical prior art systems. Many prior art systems depend upon pumps and other auxiliary equipment for taking brake control from the vehicle operator. Also, due to the inertia of many prior art systems there is a time lag between the reaction of the driver and the application of some anti-skid countermeasure to the wheel. Furthermore, many prior art systems do not include fail-safe features to protect against internal failure of the anti-skid mechanism. It was to overcome the foregoing disadvantages of many prior art systems that the disclosed invention was perfected.

SUMMARY OF THE INVENTION

In the disclosed invention, a multi-stage cam is driven by a gear engageable in a set of teeth rotating at the speed of the wheel to be controlled. The cams operate a system of hydraulic valves and pistons which in turn control the flow of hydraulic fluid to the hydraulic brake. A pressure-sensitive spool valve detects the brake pressure applied by the motor vehicle operator and when that brake pressure exceeds that usually developed during normal braking, the pressure-sensitive valve causes one of the cam operated piston valves to close. This corresponds to the skid condition or mode. By closing the cam operated piston valve, hydraulic fluid is trapped between the valve and the brake cylinder itself. While that fluid is trapped in the hydraulic line, another cam operated piston valve causes pressure to be alternately exerted and relieved in the hydraulic line thereby producing a pumping action and allowing the wheel to spin at momentary intervals. This anti-skid device includes several fail-safe features. The pressure-sensitive spool valve depends upon a spring in order to return it to its normal position after detecting the point at which the brake fluid exceeds the predetermined pressure. If this spring were to fail, a seated ball inside the pressure valve mechanism will fall into a cavity that insures that normal braking can take place. Likewise, the cam operated pistons and valves system includes another valve that will allow regular hydraulic pressure to flow to the hydraulic brake if the cam means should fail.

It is an important object of the present invention to develop an anti-skid brake control device in which the control of the brake is always by the car operator and not by auxiliary equipment such as pumps.

It is another object of the present invention to provide an anti-skid brake control device having essentially zero inertial lag and therefore a quick response to the reaction of the driver.

It is a still further object of the present invention to provide an anti-skid brake control device with fail-safe features so that in the event of failure, the control of the motor vehicle is returned to the operator.

It is yet another object of the present invention to provide an anti-skid brake control device which is low in cost, small in size and highly reliable.

It is yet another object of the present invention to provide an anti-skid brake control device in which the fluid in the brake line between the master cylinder and the brake cylinder remain constant so that the brake pedal will not fall or rise during protracted braking periods.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DESCRIPTION OF THE PREFERRED EMBODIMENT

Figure 1:
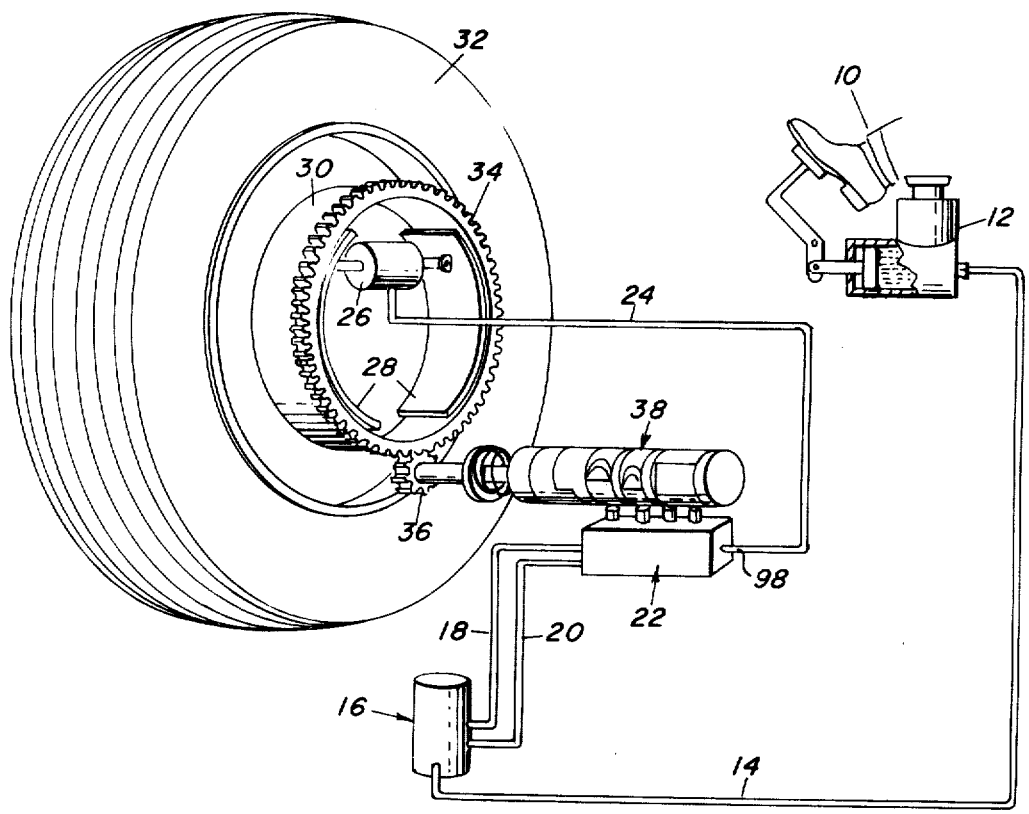
FIG. 1 is a schematic representation of the anti-skid device according to the preferred embodiment of the present invention.

FIG. 1 is a schematic representation of the entire anti-skid device as a unit. An operator 10 applies braking pressure to a master brake cylinder 12. Braking pressure is applied over line 14 to pressure-sensitive main control valve 16. The control valve 16 includes two outlets 18 and 20 connected to hydraulic valve and piston means 22. The outlet port line 24 from the hydraulic valve and piston means 22 connects in turn to wheel cylinder 26. Wheel cylinder 26 applies pressure to brake shoes 28 during braking. The hydraulic braking mechanism 26 and 28 is located inside a brake drum 30 of a motor vehicle wheel 32. An annular ring of gear teeth 34 is located around the circumference of the wheel 32. Engageable in the annular ring of teeth 34 is a drive gear 36 for driving cam unit 38. Operation of the entire anti-skid device as shown in FIG. 1 will be deferred until the component parts have been explained in detail.

Figure 2:
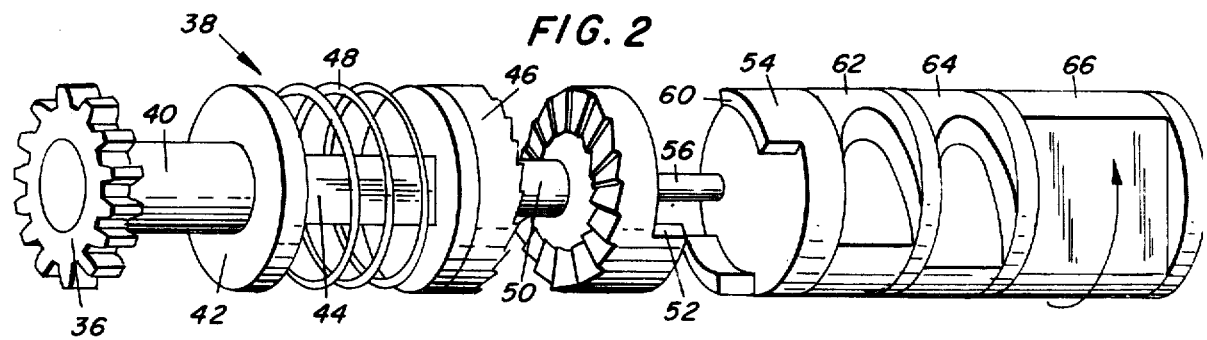
FIG. 2 is an exploded view of the cam unit and gear driving mechanism.
Figure 3:
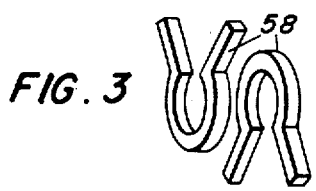
FIG. 3 is a perspective view of the dual spring mechanism that fits in the cam unit shown as FIG. 2.

FIG. 2 shows drive gear 36 which is engageable with the teeth on the brake drum 30 connected by a shaft 40 to a washer-like collar 42. The purpose of the collar 42 is to limit the motion of shaft 40 along its longitudinal axis. The extension 44 of shaft 40 is square in shape in order to engage the square opening of one-way clutch 46 which includes both sections thereof. Spring 48 serves to keep pressure on one-way clutch 46 so that both halves are normally engaged. The continued section of shaft 44 is cylindrical in shape and shown as element 50. Cylindrical shaft 50 holds the second section of one-way clutch 46 so that it is freely rotatable on shaft 50 but not slidable due to the squared continuation 44 which limits travel in one direction and lugs 52 which limit travel in the other direction when it engages the flat part of cam 54. The section of one-way clutch 46 closest to gear 36 is slidable on shaft 44 and restricted only by spring 48. The terminating portion of drive shaft 40, 44 and 50 is element 56 which is also round. Dual springs 58 which are illustrated in FIG. 3 are insertable on shaft 56. The two legs of each half of dual springs 58 are inserted between lugs 52 of one-way clutch 46 and 60 of cam 54 so that if the cam unit as a whole is restricted in its normal rotation, the legs of dual spring 58 are compressed by the continuing drive of the lugs 52 and 60. The cam unit includes a multistage cam section including cams 62, 64, and 66. Cams 62, 64, and 66 each have three cam faces 120° apart. Cam 64 is 10° advanced relative to cams 62 and 66. Cam sets 62 and 64 have rounded "front" ends such that the radius of the advancing "front" matches the radius of the pin that follows that cam.

Figure 4:
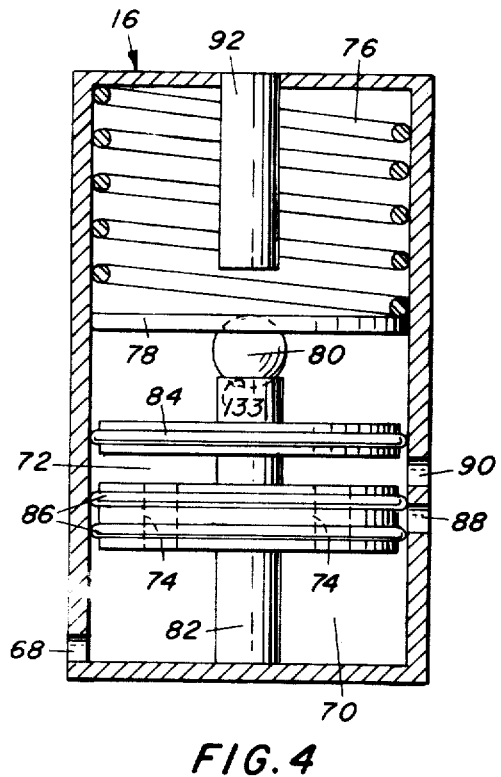
FIG. 4 is a cross-sectional diagram of the pressure-sensitive control valve under the condition of normal braking pressure.
Figure 5:
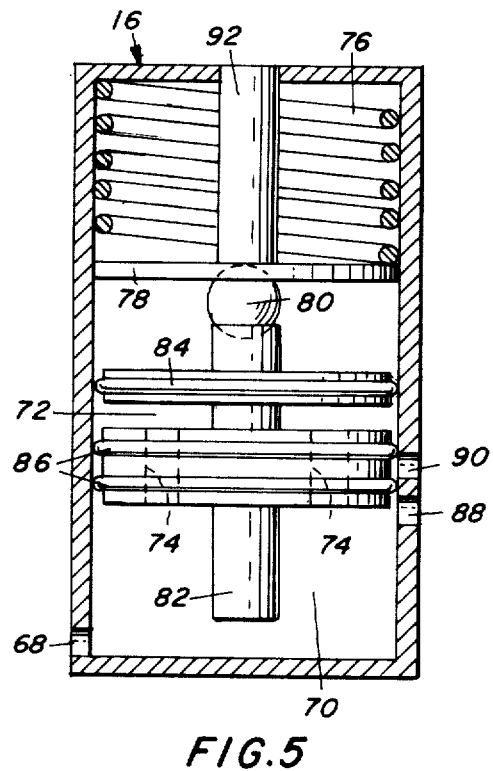
FIG. 5 is another cross-sectional view of the pressure-sensitive control valve under high braking pressure.

The pressure-sensitive main control valve is shown in FIGS. 4 and 5. Hydraulic fluid from the master brake cylinder enters the main control valve via passage 68. The hydraulic fluid then passes into lower chamber 70 and then into upper chamber 72 via passage 74. The pressure-sensitive valve assembly itself includes a spring 76 loaded against a plate 78. Plate 78 has a small indentation in its center for receiving ball 80. Ball 80 in turn is seated in an indentation in valve stem 82. Valve stem 82 carries around its periphery a set of seals 86. Under normal braking hydraulic pressure or under no hydraulic pressure, outlet port 88 of the pressure-sensitive control is mostly, but not completely, occluded and outlet 90 is completely open. Outlet port 90 connects with hydraulic line 18 and outlet port 88 connects with hydraulic line 20.

Under skid conditions the high hydraulic braking pressure forces the valve stem 82, ball 80, and plate 78 back towards a limiter pin 92 against the resistance of spring 76. This causes seal 86 to completely block outlet port 90 and fully open port 88 as shown in FIG. 5.

Figure 6:
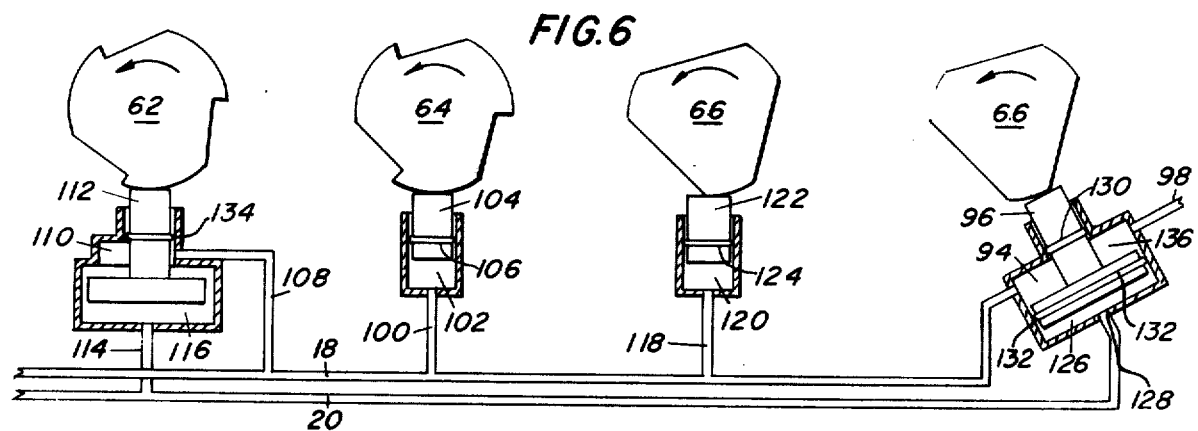
FIGS. 6, 7 and 8 are schematic representations of the cam unit and the hydraulic valve and piston units during progressive stages of the cam sequence.
Figure 7:
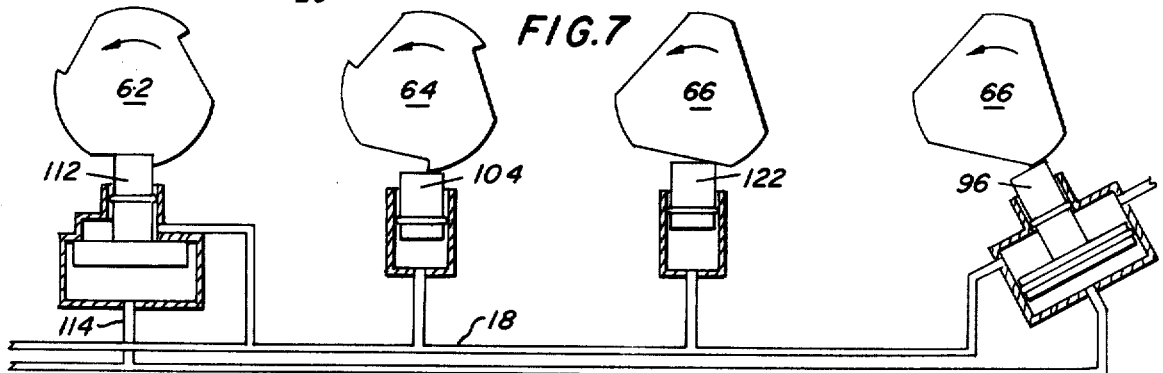
Figure 8:
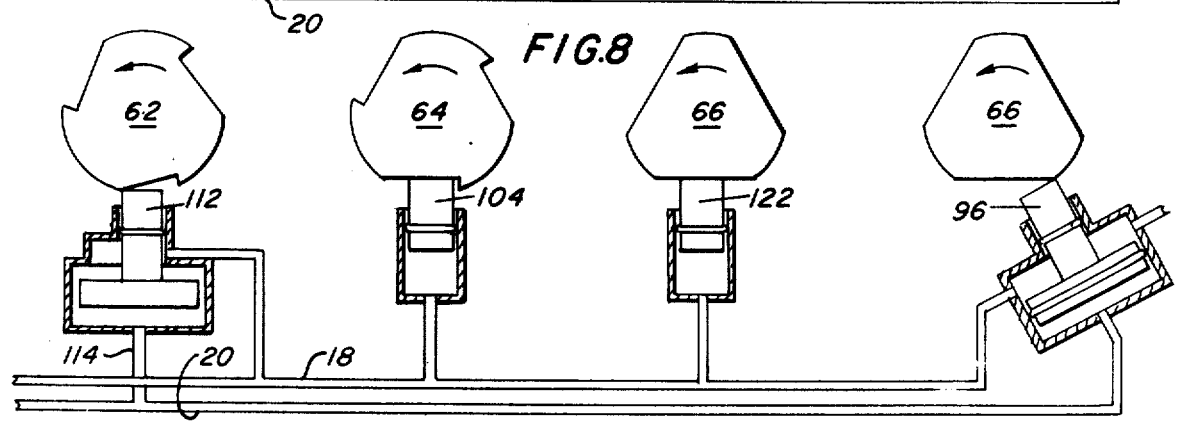

FIGS. 6, 7 and 8 show the sequential operation of the cam unit on the hydraulic valve and piston system. Those figures may best be understood by describing the operation of the system as a whole as follows.

METHOD OF OPERATION

Under normal braking conditions the hydraulic fluid from the master brake cylinder passes through passage 68, chamber 70, passage 74, to upper chamber 72 and out outlet port 90. As shown in FIGS. 6, 7 or 8 the hydraulic fluid from port 90 enters chamber 94 of cam operated valve 96. Under normal braking conditions this hydraulic braking fluid exits directly to the wheel brake cylinder via outlet 98 and line 24. Therefore, under normal braking conditions the hydraulic fluid passes directly through the pressure-sensitive control valve and the cam operated valve and piston system to the wheel brake cylinder. Side passages off outlet port line 18 include passage 100 which leads to chamber 102 of pin-type piston 104. A seal 106 on piston 104 helps maintain a satisfactory pressure within the chamber. Under normal braking conditions, the hydraulic fluid in line 18 that enters chamber 102 through passage 100 helps prepare piston 104 for operation in the skid mode.

The hydraulic fluid in chamber 102 prepares the piston 104 for the skid mode by causing it to rise until it touches the cam face proper. Outlet port line 18 also connects to passage 108 leading to chamber 110 of secondary control valve pin 112. Inasmuch as outlet 88 is partially open in the normal operating mode, a similar hydraulic pressure enters via line 114 from conduit 20 to chamber 116. Hence, in the normal operating mode control valve pin 112 is non-functioning. Pressure from line 18 also travels via passage 118 to chamber 120 and thereby exerts pressure upwardly on pin 122. Pin 122 includes a seal 124 that functions in the same manner as seal 106 of pin 104. In the normal operating mode pin 122 is forced upwardly by the pressure in line 18 so that it is prepared for possible skid operation. Pressure from port 20 also enters chamber 126 via passage 128. Pin valve 96 also includes a set of seals 130 and 132. In a like manner, the control valve pin 112 contains a seal 134. Seals 106, 124, 130, 132 and 134 all serve to protect against hydraulic leaks. During the normal mode of operation it has been shown that pistons 104 and 122 are forced into a standby mode for instant action in the eventuality of a skid.

At a predetermined hydraulic line pressure as determined by the compression of spring 76, the control valve stem 82 will be forced up against limiter pin 92. Seal 84 on the control valve stem 82 helps prevent leakage of hydraulic line fluid into the chamber where spring 76 is located. The pressure-sensitive control valve is shown in the skid mode in FIG. 5. In this mode seals 86 on the control valve stem close outlet line 18 and all the hydraulic fluid pressure is forced to egress via outlet line 20. The only passage by which hydraulic pressure can reach the brake cylinder is via outlet port line 20, passage 114, chamber 116, leaking around portion 112 of the control pin, to chamber 110, and thence out through passage 108, line 18, chamber 94, outlet 98, and then to the brake cylinder through line 24 as described in the normal mode of operation.

Whenever wheel 32 is in motion, cam unit 38 will be driven by gear 36. When pins 104 and 122 are on the round portions of cams 64 and 66, respectively, the cam will begin to drag on the pins and thereby slow down momentarily in relation to driving gear 36. This allows lug clutch 52–54 to wind up springs 58. If motion of drive 34–52 ceases, spring 58 will continue rotating cam unit 54 until pins 104 and 124 are on the flats of cams 62 and 64.

FIG. 7 shows the operation of this anti-skid device in the skid mode. Note that control valve pin 112 is now fully extended at the top of its stroke and sits in the recessed flat area of cam 62. In this position, control valve pin 112 completely blocks the flow of hydraulic fluid from chamber 116 to chamber 110 thereby completely preventing fluid from flowing from passage 114 to passage 108. Therefore, no further brake fluid can reach the wheel brake cylinder. With control valve pin 112 in the closed condition pressure existing on lugs 52 against 54 causes; the cam unit continue to rotate driven by dog clutch 46 and spring 58. After approximately 10° of rotation pin 104 drops into the recess of cam 64. This is shown in FIG. 8. The dropping of pin 104 into the flat recess of cam 64 causes chamber 102 to expand and thereby relieves the pressure on the hydraulic fluid trapped in line 18. With no line pressure in line 18, wheel 32 is free to rotate again. With further rotation, control valve pin 112 is re-opened thereby re-supplying hydraulic pressure to the brake cylinder and pin 104 is then depressed thereby returning evacuated hydraulic fluid to the line. In this manner, the amount of hydraulic fluid in the line between the master cylinder and brake cylinders remains constant. This is an improvement over other anti-skid devices in which changes in the volume of hydraulic fluid in the lines between master and brake cylinders may cause the brake pedal to rise. As long as the wheel is in motion a pumping action is produced by the rise and fall of piston 104. Since each cam has three faces, it is obvious that the cam unit produces three pumps per revolution. It has been found that a ratio of 90% "on" time to 10% "off" time produces satisfactory anti-skid control.

High braking pressure typically occurs during panic braking or when braking to avoid a skid. Frequently, the high braking pressure situation will cause the wheels to lock up and cease rotating. When this occurs one-way clutch 46 and dog clutch elements 52 and 60 stop rotating. As in the high braking pressure situation described previously the lag action of the pin, especially pin 122, acting on the cam flats will cause spring 58 to wind up. Therefore, regardless of the position of stoppage of dog clutch 52, the spring 58 will supply more than sufficient rotational impetus for the cam unit to continue rotating until pin 112 once again drops onto the flat of cam 62 as shown in FIG. 7.

The rising of pin 112 into the flat of cam 62 cuts off the hydraulic pressure to the wheel brake cylinder and in approximately 10° of rotation pin 104 drops into the flat of cam 64 as shown in FIG. 8 thereby relieving line pressure. The last approximately 10° of rotation can be supplied by spring 58 or by the leveling action of pin 122 against the tilted flat of cam 66 pin 112 being short enough to allow 10° of rotation without holding against the flat of cam 62. With high pressure still acting on pin 122 the flat surface of pin 122 will seek to align itself in a parallel relationship with the flat surface of cam 66. With pressure thus relieved the wheel 32 will again begin to turn. The pressure still left in the line causes pin 122 to drag on the face of cam 66 and thereby delays the rotation of the cam unit as a whole even as clutch 46 and dog 52 rotate. The drag of pin 122 allows spring 58 to wind up again and when sufficient pressure is exerted by dog 52 against spring 58 to overcome the resistance of pin 104, then the entire cam unit is free to continue rotation into another pumping cycle.

As pin 112 rises, hydraulic pressure is again returned to line 18 and thus to pin valve 96 and then to the brake cylinder. Pin valve 112 helps assure that there is no return of hydraulic pressure to the brake cylinder until spring 58 is wound up again. Therefore, as soon as the hydraulic line pressure returns the wheel will again stop rotating and spring 58 will advance the cam unit to the next pressure relieving sequence.

The above-described anti-skid device includes two built-in fail-safe features that give the driver of the motor vehicle full conventional braking capability if certain failures in the system do occur.

The first fail-safe feature is built into the pressure-sensitive control valve shown in FIGS. 4 and 5 and illustrated in FIG. 1 as 16. The structure of the pressure-sensitive control valve 16 includes a ball 80 which is seated on valve stem 82 and fits snugly into a recess in plate 78. Hydraulic pressure is transmitted through ball 80 and plates 78 to the spring 76. If spring 76 fails, that is, breaks or otherwise loses its resilience, then pressure will no longer be exerted on ball 80 and it will drop into the cavity shown as 133. The next application of brake pressure would thereby drive valve stem 82 directly into plate 78 so that the two members abut. This would cause the seals 86 on the valve stem 82 to travel past outlet port to line 18 so that both port line 18 and outlet port line 20 are open. Conventional braking operation can then proceed as if the anti-skid unit were not there.

The second fail-safe feature of this invention is designed to guard against failure of the entire cam unit 36 and 38, or any part thereof. During normal braking operation a failure of the drive mechanism 36 or cam unit 38 would have no effect on the operation of the brake system since the hydraulic fluid would pass unimpeded down outlet port line 18 through valve 96 and outlet port 98 through line 24 to the brake cylinder unaffected by cam rotation. In the skid mode, under high braking pressure, if the cam unit 54 were stopped in the position in which pin 112 is elevated, then there would be no line pressure from that pin valve to the brake cylinder. Such a situation might occur when pin valve 112 is riding on the flat part of cam 62.

In such a situation pin valve 96 comes into play. As previously described, pin valve 96 is sealed with seals 130 and 132 and includes a lower chamber 126 for receiving high pressure directly from outlet 20. An upper chamber 136 is sensitive to the pressure on outlet line 24. As long as there is high pressure on both sides of pin 96 from chambers 126 and 136, then there is a slight tendency of pin 96 to exert downward pressure on cam 66. Pin 96 is set at approximately 20° advanced rotation in relationship to the other pins as seen in FIGS. 6, 7 and 8. If there is a failure of the cam unit in the skid mode and pin 112 is closed in the elevated condition, then there would be no pressure on chamber 136 if pin piston 104 is on the flat of cam 64 thereby relieving line pressure. In such a case, there would only be high pressure acting on lower chamber 126 of pin valve 96. The high pressure acting on pin valve 96 from the lower chamber 126 will force the flat face of pin valve 96 against cam 66. The pressure of the flat head of pin valve 96 will cause the cam 66 to rotate until the flat of that cam is aligned flat with the pin face of pin valve 96. The action of pin valve 96 on cam 66 is such as to supply sufficient rotation to cam unit 38 such that control pin valve 112 again opens and re-supplies pressure to the brake cylinder. With pressure re-supplied to outlet port line 18 and chamber 136 the pin valve 96 will again be caused to recede. The opposition of pressures in upper chamber 136 and lower chamber 126 may cause a slight see-saw action in the cam unit thereby creating on and off outlet line pressure but without pin piston 104 having much effect on the pumping action. Slight backward motion of cam unit 38 is possible depending upon spring 58, clutch 46, and the contion of pin valve 96. It should be conspicuous from the foregoing that cam 66 is designed so that it may be lever-armed by pins 122 or 96 into a predetermined desired inclination.

While a preferred embodiment of this anti-skid device has been disclosed, other variations would be obvious to one of ordinary skill in the art. For instance the same anti-skid device will function on air instead of hydraulic fluid, the only difference being that venting of line pressure to the outside is necessary. Also, electrical brakes can be used with the same system with solenoids applying pin pressure on pin 122 and with pin control valve 112 activating an "on-off" switch.

Many other modifications of the described hydraulic system would also be obvious. For instance, pin piston 122 is not entirely necessary, if sufficient drag may be supplied by piston 104. Pin 122 merely through its leveling action causes cam 66 to rotate until the flat head of pin 122 is aligned parallel with the flat of cam 66. Instead 10° or so of rotation could be supplied by a spring 58 with suitable characteristics. It would also be possible to connect passage 118 to outlet port line 88 instead of outlet port line 90 in a modified embodiment. The advanced sequence of the cams relative to one another and the hydraulic piston and valve system may be altered to suit the particular application. It has been found that a relative difference of approximately 10° between cams 62 and 64 is desirable. However, this relative setting may be adjusted by several degrees and still achieve satisfactory results. Likewise, it has been found that cam 66 may be advanced a total of 30° or more relative to pin 96. Obviously, the advanced setting of cams 62, 64, and 66 is an adjustment that depends, in large part, on magnitude of the desired results. Of course, a cam unit could be designed having any number of faces. However, three faces 120° apart has been found to be desirable in this particular application.

In a general manner, while there have been described effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. An anti-skid device for controlling the braking of a wheel comprising,
    a master brake cylinder,
    a pressure-sensitive valve means connected to said master brake cylinder,
    a valve and piston means having an inlet means and an outlet means, said inlet means connected to said pressure-sensitive valve means,
    a brake cylinder connected to said wheel, said outlet means connected to said brake cylinder,
    a cam means driven by said wheel operating said valve and piston means,
    to impart a pumping action to said brake cylinder when the pressure exerted by said master cylinder on said pressure-sensitive valve exceeds a predetermined valve, and, a gear means driven by said wheel, said gear means in turn driving said cam means.

2. The device of claim 1 further including a spring means,
    said spring means situated to bias said cam means against said gear means.

3. The device of claim 1 wherein said cam means further includes a one-way clutch for allowing rotation only in one direction.

4. An anti-skid device for controlling the braking of a wheel comprising,
    a master brake cylinder,
    a pressure-sensitive valve means connected to said master brake cylinder,
    a valve and piston means having an inlet means and an outlet means, said inlet means connected to said pressure-sensitive valve means,
    a brake cylinder connected to said wheel, said outlet means connected to said brake cylinder;
    a cam means driven by said wheel operating said valve and piston means,
    to impart a pumping action to said brake cylinder when the pressure exerted by said master cylinder on said pressure-sensitive valve exceeds a predetermined value, said pressure sensitive valve means including two outlet ports connected to said inlet means and wherein only one of said outlet ports is opened when the braking pressure exceeds said predetermined value, and a first fail-safe device for opening both of said two outlet ports if said pressure-sensitive valve means fails.

5. The device of claim 4 wherein said first fail-safe device includes,
    a valve stem within said pressure-sensitive valve means,
    a ball seated in a recess at one end of said valve stem,
    a plate with a recessed center for receiving said ball, and
    a spring for biasing said plate against said ball,
    wherein said ball will fall off the end of said valve stem if said spring fails.

6. The device of claim 4 and including a second fail-safe device for allowing brake fluid to reach the cylinder if said cam means fails.

7. The device of claim 4 wherein said second fail safe device comprises a cam-operated valve including an upper and lower chamber on either side of said second piston means, and a second piston means facing said lower chamber, said upper chamber having an exit port to said brake cylinder and in inlet port connected to an outlet port of said pressure-sensitive valve means and said lower chamber connected to a second outlet port of said pressure-sensitive valve means, said exit port means of said cam-operated valve remaining open when the pressure in said upper chamber is approximately equal to the pressure in said lower chamber.

8. An anti-skid device for controlling the braking of a wheel comprising,
    a master brake cylinder,
    a pressure-sensitive valve means connected to said master brake cylinder,
    a valve and piston means having an inlet means and an outlet means, said inlet means connected to said pressure-sensitive valve means,
    a brake cylinder connected to said wheel, said outlet means connected to said brake cylinder, and
    a cam means driven by said wheel operating said valve and piston means,
    to impart a pumping action to said brake cylinder when the pressure exerted by said master cylinder on said pressure-sensitive valve exceeds a predetermined value, said pressure-sensitive valve means including two outlet ports connected to said inlet means and wherein only one of said outlet ports is opened when the braking pressure exceeds said predetermined value, wherein said valve and piston means includes a plurality of elements including at least one valve and at least one piston, said one valve closing when the braking pressure on said pressure-sensitive valve means exceeds said predetermined value whereupon said piston imparts said pumping action to said hydraulic brake means.

* * * * *